(12) United States Patent
Singh et al.

(10) Patent No.: US 12,531,721 B2
(45) Date of Patent: Jan. 20, 2026

(54) SYSTEM AND METHOD FOR HOMOMORPHIC ANCILLARY DOCUMENT DATA ENCRYPTION, DATA AUTHENTICATION, AND DATA TRANSFER

(71) Applicant: BANK OF AMERICA CORPORATION, Charlotte, NC (US)

(72) Inventors: Sidharth Singh, Fort Mill, SC (US); Naveen Reddy Mamidi, Telangana (IN); Rahul Pabolu, Telangana (IN); Maneesh Kumar Sethia, Telangana (IN); Mayank Yadav, Uttar Pradesh (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 28 days.

(21) Appl. No.: 18/735,357

(22) Filed: Jun. 6, 2024

(65) Prior Publication Data

US 2025/0379722 A1   Dec. 11, 2025

(51) Int. Cl.
*H04L 9/08* (2006.01)
*G06Q 20/20* (2012.01)
*G06Q 20/34* (2012.01)
*G06Q 20/38* (2012.01)
*H04L 9/00* (2022.01)

(52) U.S. Cl.
CPC ......... *H04L 9/0819* (2013.01); *G06Q 20/204* (2013.01); *G06Q 20/34* (2013.01); *G06Q 20/3821* (2013.01); *H04L 9/008* (2013.01)

(58) Field of Classification Search
CPC .................................................. H04L 9/0819
See application file for complete search history.

(56) References Cited

U.S. PATENT DOCUMENTS

| | | | |
|---|---|---|---|
| 8,170,936 B2 | 5/2012 | Ahmad | |
| 8,726,360 B2 | 5/2014 | Dietrich | |
| 9,355,374 B2 | 5/2016 | Barnett | |
| 9,398,004 B2 | 7/2016 | Dietrich | |
| 11,200,562 B1 | 12/2021 | Techel | |
| 11,823,205 B1 | 11/2023 | Asefi | |
| 11,847,633 B1 | 12/2023 | Techel | |
| 11,915,233 B2 * | 2/2024 | Srivastava | .......... H04L 63/0428 |

(Continued)

*Primary Examiner* — Simon P Kanaan
(74) *Attorney, Agent, or Firm* — Moore & Van Allen PLLC; Andrew T. Wood

(57) ABSTRACT

Systems, computer program products, and methods are described herein for homomorphic ancillary document data encryption, data authentication, and data transfer. The present disclosure includes receiving an interaction event from a terminal device, receiving, upon a first condition where the resource transfer card comprises an embedded document card comprising at least one document data file, a network check comprising a document data file trigger, retrieving, from the resource transfer card, the at least one document data file, encrypting the at least one document data file using a homomorphic encryption protocol, transmitting the at least one homomorphic encrypted document data file, receiving a signal comprising an authentication credential associated with a cardholder of the resource transfer card, recording the authentication credential, and transmitting a decryption key configured to decrypt the at least one homomorphic encrypted document data file.

20 Claims, 6 Drawing Sheets

(56) References Cited

U.S. PATENT DOCUMENTS

| | | |
|---|---|---|
| 12,106,291 B2 * | 10/2024 | Jain ................ G06Q 20/108 |
| 2010/0257612 A1 | 10/2010 | McGuire |
| 2016/0294815 A1 | 10/2016 | Dietrich |
| 2019/0026736 A1 | 1/2019 | Maheshwari |
| 2019/0182216 A1 * | 6/2019 | Gulak ................ H04L 63/0414 |
| 2022/0156731 A1 | 5/2022 | Sheth |
| 2022/0374899 A1 | 11/2022 | Mahato |
| 2023/0092733 A1 | 3/2023 | Ravinathan |
| 2023/0120897 A1 * | 4/2023 | Kozlowski, III ......... H04L 9/32 705/75 |
| 2023/0368211 A1 | 11/2023 | Douglas |
| 2023/0385828 A1 | 11/2023 | Kurani |
| 2024/0039736 A1 * | 2/2024 | Dunjic ................ G06F 9/5011 |
| 2024/0394390 A1 * | 11/2024 | Lohar ................ G06F 21/6218 |

\* cited by examiner

SYSTEM AND METHOD FOR HOMOMORPHIC ANCILLARY DOCUMENT DATA ENCRYPTION, DATA AUTHENTICATION, AND DATA TRANSFER

TECHNOLOGICAL FIELD

Example implementations of the present disclosure relate to a system and method for homomorphic ancillary document data encryption, data authentication, and data transfer.

BACKGROUND

The technology behind resource transfers has evolved significantly, now favoring resource transfer cards over cash. Resource transfer cards have become the primary medium for conducting resource transfers due to their convenience and security features. However, many resource transfers now necessitate additional identification or personal information beyond merely swiping a resource transfer card. For instance, certain purchases require the presentation of a driver's license, insurance information, or other personal documents, which are typically stored separately from the resource transfer card. This creates a problem when individuals forget these documents, as they are unable to complete their resource transfers without the required supplementary information.

BRIEF SUMMARY

Systems, methods, and computer program products are provided for homomorphic ancillary document data encryption, data authentication, and data transfer.

In one aspect, a system for homomorphic ancillary document data encryption, data authentication, and data transfer is presented. The system includes a processing device, a non-transitory storage device containing instructions when executed by the processing device, causes the processing device to perform the steps of receiving an interaction event from a terminal device of a merchant, the terminal device generating the interaction event as a result of initiating a resource transfer that may include a document data file data request and receiving an interaction from a resource transfer card, receiving, upon a first condition where the resource transfer card may be an embedded document card that may include at least one document data file, a first resource transfer card determination indicator, receiving a network check that may include a document data file trigger, retrieving, from the resource transfer card, the at least one document data file, encrypting, at the terminal device, the at least one document data file using a homomorphic encryption protocol to generate at least one homomorphic encrypted document data file, transmitting, from the terminal device to a network associated with the merchant, the at least one homomorphic encrypted document data file, receiving, via an identity verification pad of the resource transfer card, a signal that may include an authentication credential associated with a cardholder of the resource transfer card, recording the authentication credential, and transmitting, to the network associated with the merchant, a decryption key configured to decrypt the at least one homomorphic encrypted document data file.

In some implementations, the instructions may further cause the processing device to perform the steps of receiving, from the network associated with the merchant, an authorization request for the resource transfer, and completing the resource transfer.

In some implementations, the instructions may further cause the processing device to perform the steps of receiving, upon a second condition where the resource transfer card may be a traditional resource transfer card, a second resource transfer card determination indicator.

In some implementations, after receiving the second resource transfer card determination indicator, the resource transfer may be completed without retrieving the at least one document data file.

In some implementations, the at least one document data file may be at least one selected from the group consisting of driver's license, birth certificate, and identification card.

In some implementations, the identity verification pad of the resource transfer card may be a fingerprint reader, and the authentication credential may be fingerprint data.

In some implementations, the instructions may further cause the processing device to perform the steps of receiving, via an input to the terminal device of the merchant, a second signal that may include a second authentication credential associated with the cardholder of the resource transfer card, and the second authentication credential may be a personal identification number.

In another aspect, a computer program product for homomorphic ancillary document data encryption, data authentication, and data transfer is presented. The computer program product includes a non-transitory computer-readable medium including code causing an apparatus to receive an interaction event from a terminal device of a merchant, the terminal device generating the interaction event as a result of initiating a resource transfer that may include a document data file data request and receiving an interaction from a resource transfer card, receive, upon a first condition where the resource transfer card may be an embedded document card that may include at least one document data file, a first resource transfer card determination indicator, receive a network check that may include a document data file trigger, retrieve, from the resource transfer card, the at least one document data file, encrypt, at the terminal device, the at least one document data file using a homomorphic encryption protocol to generate at least one homomorphic encrypted document data file, transmit, from the terminal device to a network associated with the merchant, the at least one homomorphic encrypted document data file, receive, via an identity verification pad of the resource transfer card, a signal that may include an authentication credential associated with a cardholder of the resource transfer card, record the authentication credential, and transmit, to the network associated with the merchant, a decryption key configured to decrypt the at least one homomorphic encrypted document data file.

In some implementations, the code may further cause the apparatus to receive, from the network associated with the merchant, an authorization request for the resource transfer, and complete the resource transfer.

In some implementations, the code may further cause the apparatus to receive, upon a second condition where the resource transfer card may be a traditional resource transfer card, a second resource transfer card determination indicator.

In some implementations, after receiving the second resource transfer card determination indicator, the resource transfer may be completed without retrieving the at least one document data file.

In some implementations, the at least one document data file may be at least one selected from the group consisting of driver's license, birth certificate, and identification card.

In some implementations, the identity verification pad of the resource transfer card may be a fingerprint reader, and the authentication credential may be fingerprint data.

In some implementations, the code may further cause the apparatus to receive, via an input to the terminal device of the merchant, a second signal that may include a second authentication credential associated with the cardholder of the resource transfer card, and the second authentication credential may be a personal identification number.

In yet another aspect, a method for homomorphic ancillary document data encryption, data authentication, and data transfer is presented. The method includes receiving an interaction event from a terminal device of a merchant, the terminal device generating the interaction event as a result of initiating a resource transfer that may include a document data file data request and receiving an interaction from a resource transfer card, receiving, upon a first condition where the resource transfer card may be an embedded document card that may include at least one document data file, a first resource transfer card determination indicator, receiving a network check that may include a document data file trigger, retrieving, from the resource transfer card, the at least one document data file, encrypting, at the terminal device, the at least one document data file using a homomorphic encryption protocol to generate at least one homomorphic encrypted document data file, transmitting, from the terminal device to a network associated with the merchant, the at least one homomorphic encrypted document data file, receiving, via an identity verification pad of the resource transfer card, a signal that may include an authentication credential associated with a cardholder of the resource transfer card, recording the authentication credential, and transmitting, to the network associated with the merchant, a decryption key configured to decrypt the at least one homomorphic encrypted document data file.

In some implementations, the method may further include receiving, from the network associated with the merchant, an authorization request for the resource transfer, and completing the resource transfer.

In some implementations, the method may further include receiving, upon a second condition where the resource transfer card may be a traditional resource transfer card, a second resource transfer card determination indicator.

In some implementations, after receiving the second resource transfer card determination indicator, the resource transfer may be completed without retrieving the at least one document data file.

In some implementations, the at least one document data file may be at least one selected from the group consisting of driver's license, birth certificate, and identification card.

In some implementations, the identity verification pad of the resource transfer card may be a fingerprint reader, and the authentication credential may be fingerprint data.

In some implementations, the method may further include receiving, via an input to the terminal device of the merchant, a second signal that may include a second authentication credential associated with the cardholder of the resource transfer card, and the second authentication credential may be a personal identification number.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 2:
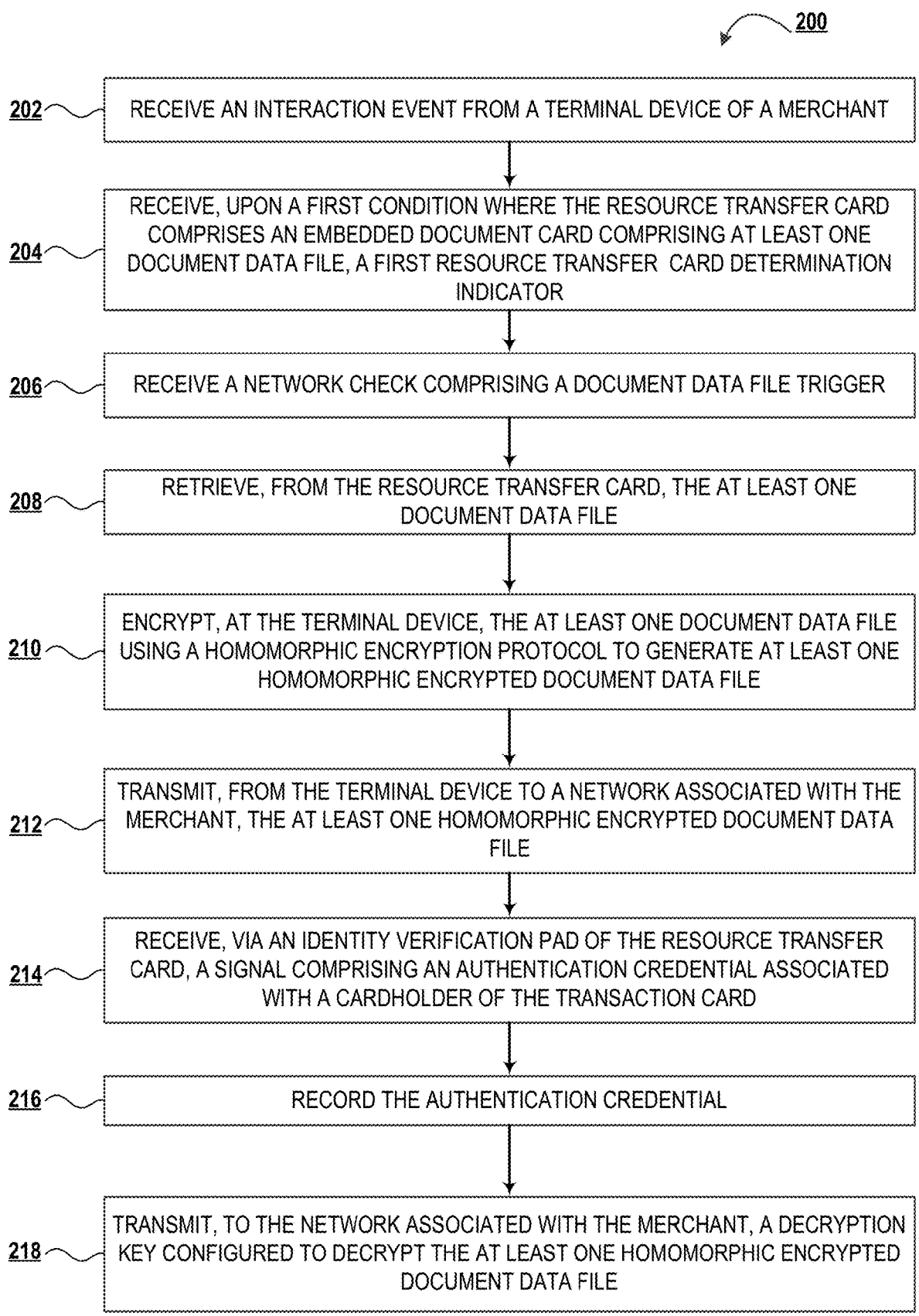
Figure 3:
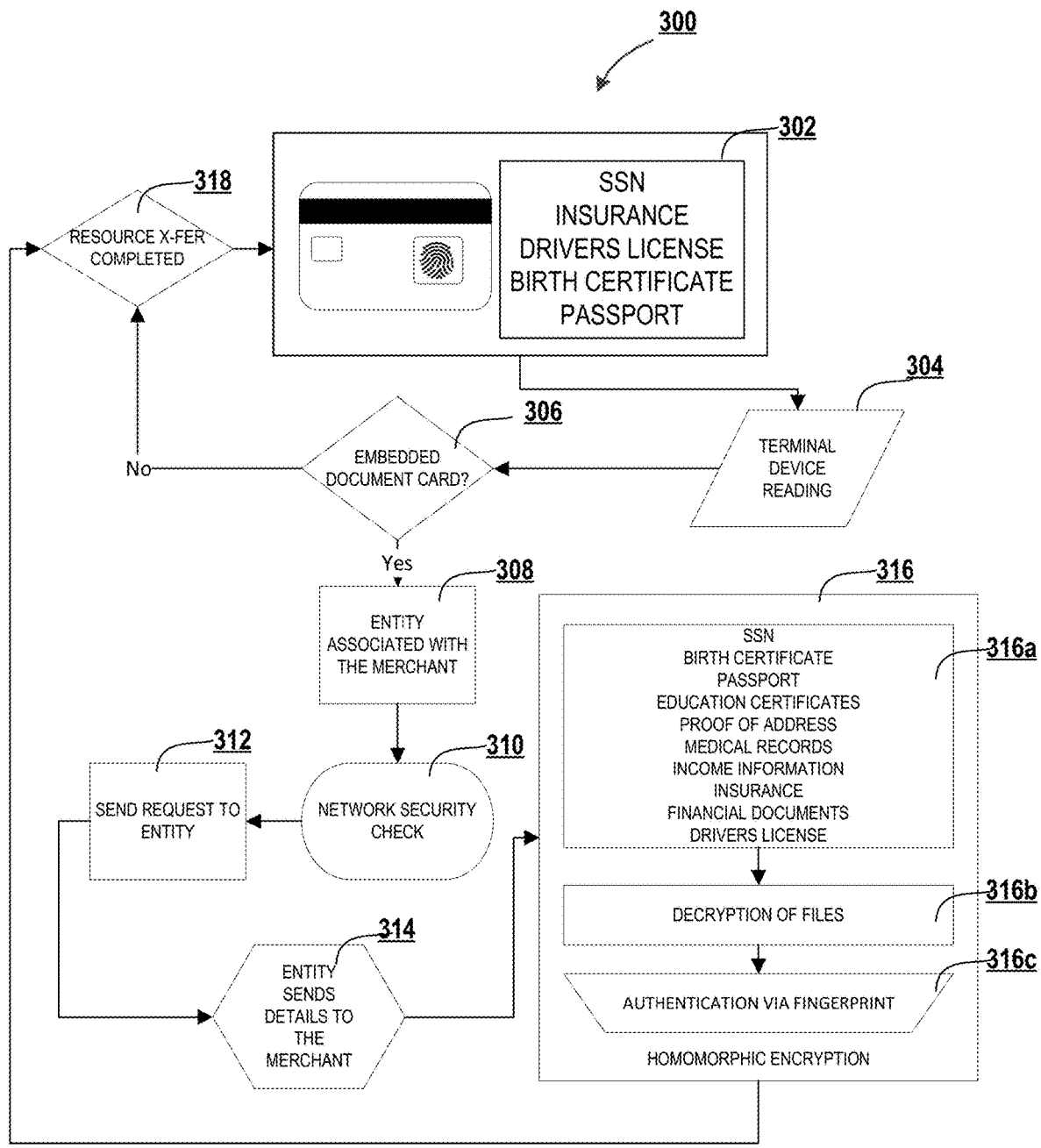

FIGS. 1A-1D illustrate technical components of an exemplary distributed computing environment for homomorphic ancillary document data encryption, data authentication, and data transfer, in accordance with an implementation of the disclosure;

FIG. 2 illustrates a process flow for homomorphic ancillary document data encryption, data authentication, and data transfer, in accordance with an implementation of the disclosure; and FIG. 3 illustrates a graphical architectural representation of homomorphic ancillary document data encryption, data authentication, and data transfer, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, a "merchant" may refer to a person, business, or entity engaged in the sale of goods or services to consumers or other businesses. This includes online retailers, brick-and-mortar stores, wholesalers, car dealerships, hospitals, and any party involved in commercial resource transfers. For example, a local grocery store, an online electronics retailer, a car dealership, or a hospital would all be considered merchants.

As used herein, a "terminal device" or "terminal" may refer to a device used to facilitate electronic resource transfers, typically involving payment processing. This includes point-of-sale terminals, card readers, mobile payment devices, and other hardware or software used to initiate, authorize, or complete resource transfers. In the context of merchant resource transfers, a terminal device serves as an endpoint in a network, facilitating communication between the merchant's system and the cardholder's system. It may be in operable communication with one or more of an entity associated with the merchant and an entity associated with a cardholder interacting with the terminal device.

As used herein, "authentication credentials" may be any information that can be used to identify of a user. For example, a system may prompt a user to enter authentication information such as a username, a password, a personal identification number (PIN), a passcode, user characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some implementations, the system may be owned or operated by an entity. In such implementations, the entity may employ additional computer systems, such as authentication servers, to validate and certify resources inputted by the plurality of users within the system. The system may further use its authentication servers to certify the identity of users of the system, such that other users may verify the identity of the certified users. In some implementations, the entity may certify the identity of the users. Furthermore, authentication information or permission may be assigned to or required from a user, application, computing node, computing cluster, or the like to access stored data within at least a portion of the system.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a element matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some implementations, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some implementations, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

The technical problem and challenges lie in the integration gap between resource transfer card resource transfers and the supplementary identification or personal information required for certain purchases. While resource transfer cards offer convenience and security, resource transfers increasingly demand additional documents like driver's licenses or insurance information. These documents, typically stored separately, present a challenge when forgotten, hindering resource transfer completion. The dilemma lies in synchronizing disparate data sources to streamline the resource transfer process, minimizing the likelihood of abandonment due to missing information. Addressing this requires robust data integration solutions ensuring real-time accessibility and verification of requisite documents during resource transfers, enhancing user experience and reducing friction points in the payment process.

Existing technical solutions to this issue primarily revolve around mobile applications and digital wallets that aim to consolidate various forms of identification and personal information. These solutions offer the convenience of storing documents electronically, allowing users to access them when needed during resource transfers. However, their effectiveness is limited by factors such as compatibility issues with diverse payment systems, security concerns regarding data breaches or identity malfeasance, and reliance on network connectivity for document retrieval. Additionally, adoption rates vary among consumers, with some hesitant to entrust sensitive information to digital platforms. While these solutions represent strides towards addressing the integration gap, their shortcomings underscore the ongoing need for more robust and universally accepted methods of seamlessly incorporating supplementary information into resource transfers.

Addressing these challenges requires the establishment of a system and method for homomorphic ancillary document data encryption, data authentication, and data transfer. Such a framework allows for resource transfers to occur that not only include the transfer of resources in the traditional manner (e.g., the transfer of resources between one entity and another entity), but also allow for the secure transfer of documents belonging to the cardholder that may be pertinent or required in such resource transfers (e.g., drivers license, insurance card, birth certificate, or the like). A resource transfer card belonging to a user may include such documents (document data files) stored therein, which may be encrypted using a homomorphic encryption method to allow for secure document transfer while still allowing for computations to occur on the document data before or after the transfer thereof.

To do so, a request for a resource transfer accompanied by a document data file request for an ancillary document (e.g., driver's license, birth certificate) may be received. An interaction event from a terminal device may be received by the insertion of a card at the terminal device of a merchant by a cardholder. The terminal device may determine whether the card is an Embedded Document Card ("EDC") having a chip holding at least one ancillary document data file. If the card is not an EDC, the resource transfer may be completed in a traditional manner without regards to any document data file request or ancillary document data file, under the presumption that the merchant will fulfill this requirement with the cardholder independently. If the card is an EDC, a trigger may be sent to the cardholder's entity through a network security check. The network security check may also include the terminal device providing the entity with merchant identifier, geolocation, etc. The cardholder's entity may send instructions to encrypt document data files on the card at the terminal via homomorphic encryption. In other implementations, the document data files on the card are already encrypted. Homomorphic encrypted document data files may then be transmitted to merchant system (or entity) from the terminal device. Homomorphic encryption may not be used, but it could allow other operations to occur later such as searching, filtering, aggregating, or performing analysis (e.g., statistical analysis). The cardholder's entity may then send a key to the merchant system (or entity) to decrypt the document data files. The resource transfer may then be authenticated via an authentication protocol. The authentication protocol may include a fingerprint reading from a fingerprint reader of the card. Additionally, or alternatively (e.g., if the fingerprint reading is unsuccessful), the system may prompt the cardholder for a personal identification number at the terminal device. The resource transfer may then be completed, which could include the merchant entity sending an authorization request to the cardholder entity.

What is more, the present disclosure provides a technical solution to a technical problem. As described herein, the technical problem includes the inability to synchronize disparate data sources to streamline the resource transfer process and minimize the likelihood of abandonment due to missing information. Stated differently, an integration gap exists between resource transfer card resource transfers and the supplementary identification or personal information required for certain resource transfers. The present disclosure embraces an improvement over existing solutions, including mobile applications and digital wallets, by allowing for the transfer of document data file(s) alongside traditional resource transfers (i) with fewer steps to achieve the solution (e.g., requiring only one user interaction and triggering event at a terminal device), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., allowing, by means of homomorphic encryption, verification and analysis of document data file before, during, or after the document data file is transmitted to the merchant), (iii) removing manual input and waste from the implementation of the solution, thus improving speed and efficiency of the process and conserving network resources (e.g., allowing for the streamlined transfer of both resources and document data file as a result of a single request therefore, instead of requiring a merchant to receive a hard-copy of a document, scan the document, and upload to the merchant's network), (iv) determining an optimal amount of resources that need to be used to implement the solution, thus reducing network traffic and load on existing network resources (e.g., determining if the resource transfer card presented at the terminal device is an electronic document card, and if not, avoiding unnecessary process steps and data routing). In other words, the solution may bypass a series of steps previously implemented, thus further conserving network resources. Furthermore, the technical solution described herein uses a rigorous, computerized process to perform specific tasks and/or activities that were not previously performed.

Figure 1A:
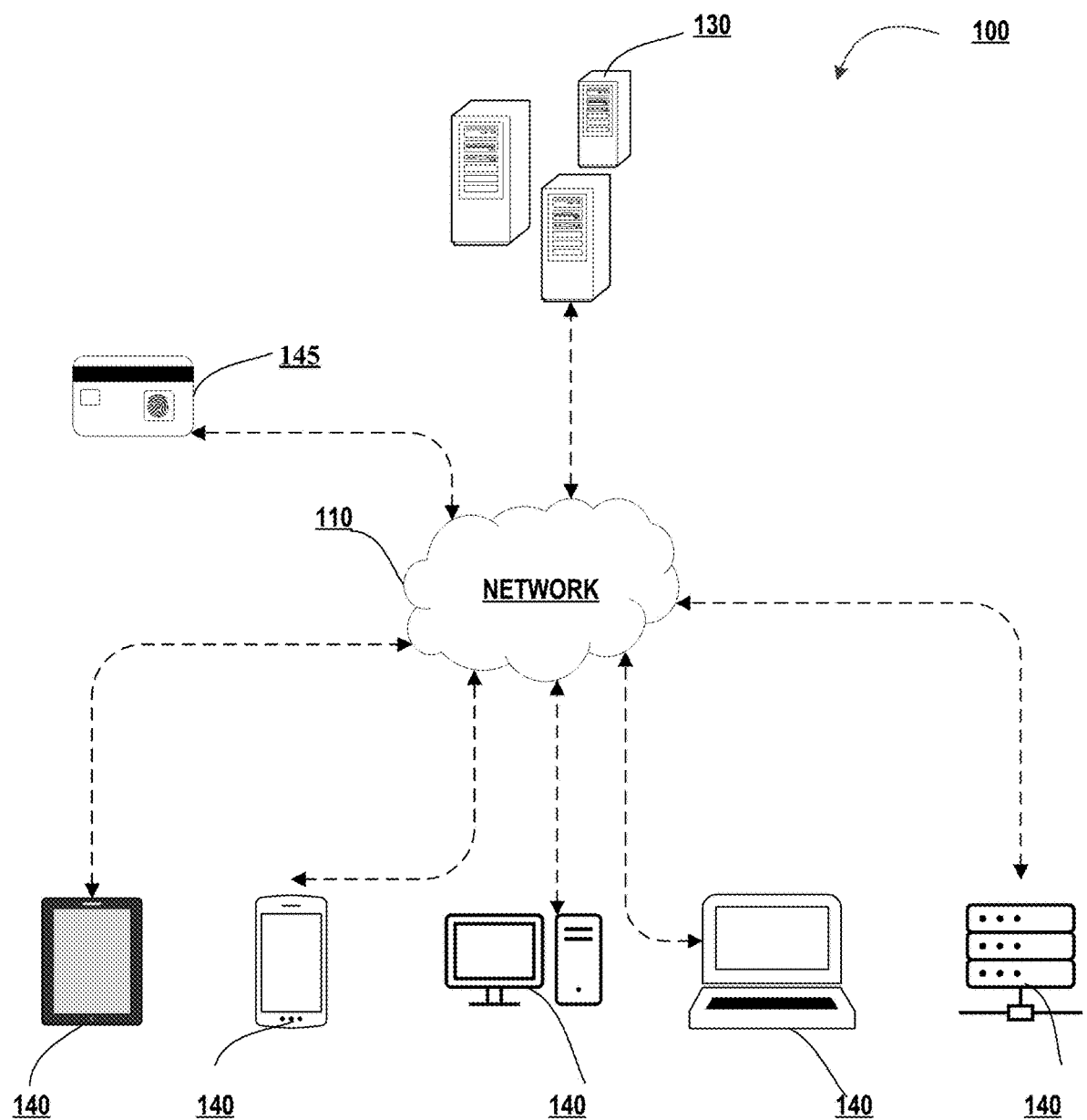
Figure 1B:
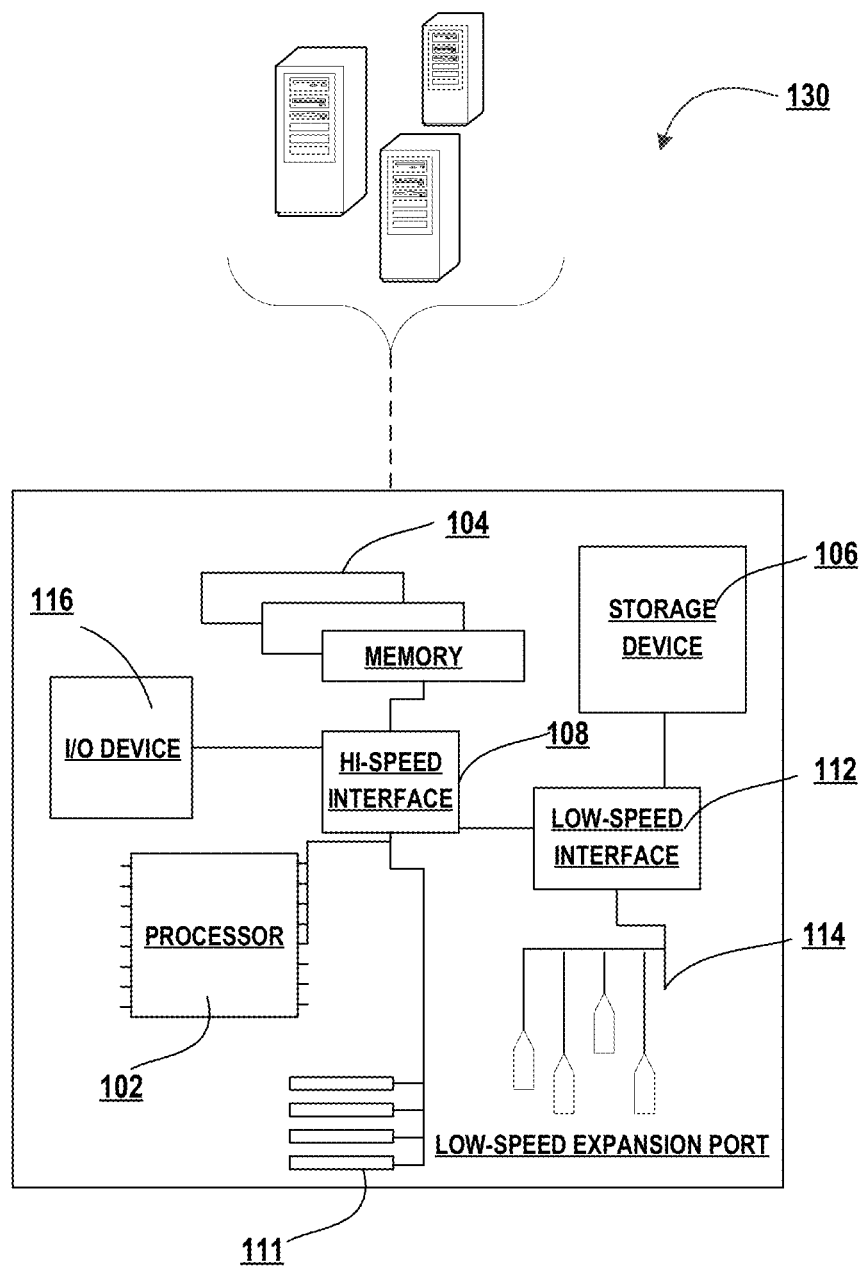
Figure 1C:
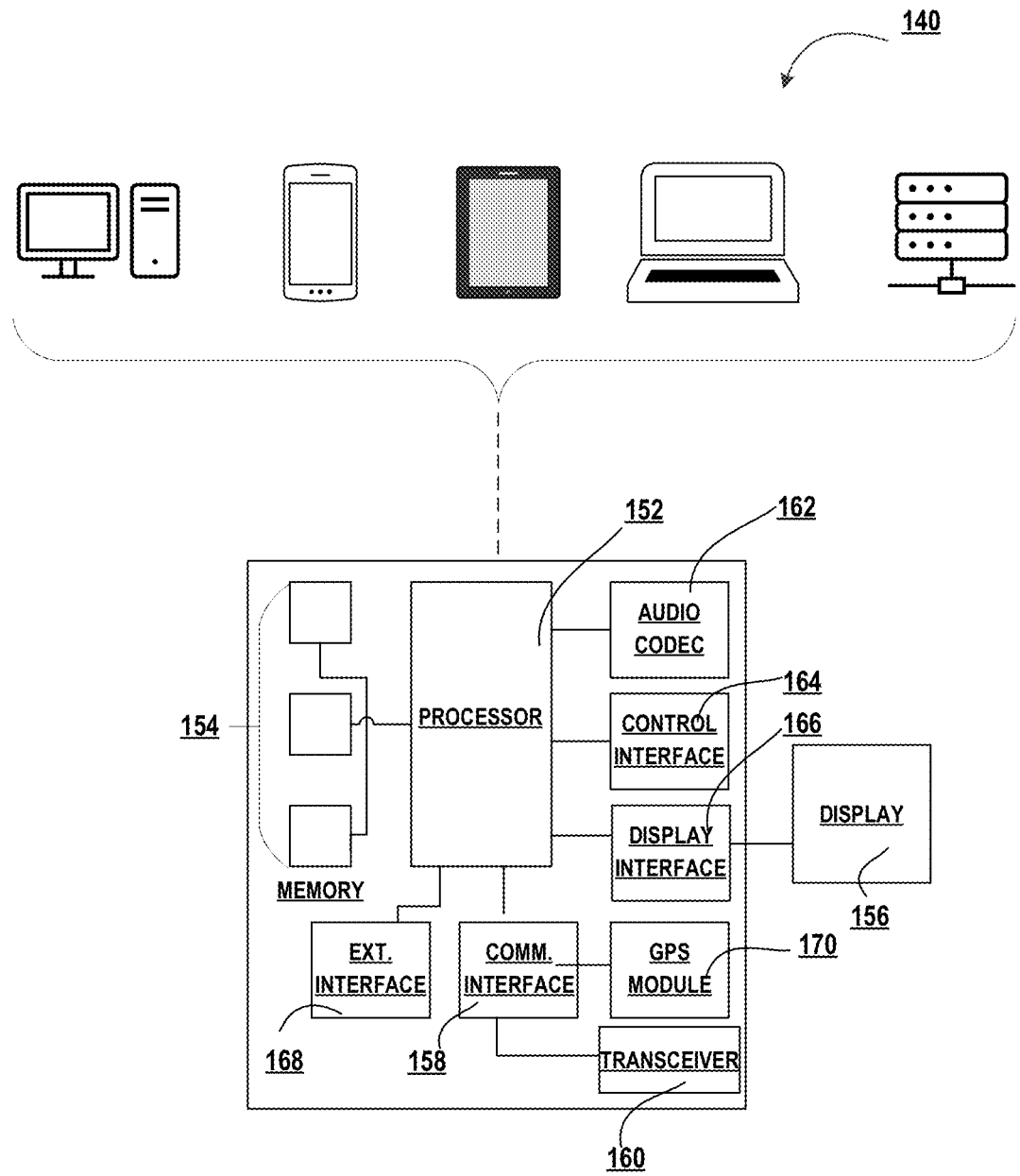

FIGS. 1A-1C illustrate technical components of an exemplary distributed computing environment 100 for homomorphic ancillary document data encryption, data authentication, and data transfer, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one implementation includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Figure 1D:
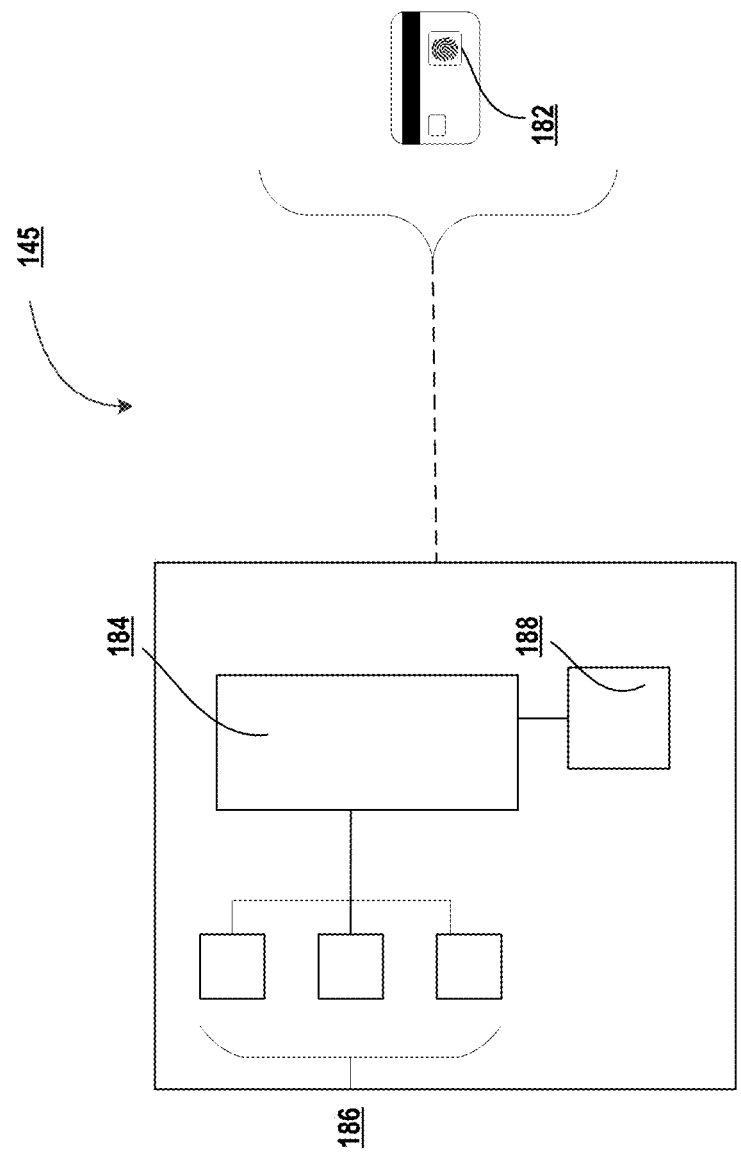

FIG. 1D illustrates an exemplary component-level structure of the resource transfer card(s) 145, in accordance with an implementation of the disclosure. The resource transfer card(s) 145 includes a processor 184, memory 186, and a communication interface 188, among other components. The resource transfer card(s) 145 may also be provided with a storage device, such as a microdrive or other device, to provide additional storage. Each of the components 184, 186, and 188 are interconnected using various buses and/or circuit traces, and several of the components may be mounted on a common printed circuit board ("PCB"), motherboard, or in other manners as appropriate.

The processor 184 is configured to execute instructions within the resource transfer card(s) 145, including instructions stored in the memory 186, including certain logic, data processing, and data storing functions. The processor may be implemented as a chipset of chips that include separate and multiple analog and digital processors. The processor may be configured to provide, for example, for coordination of the other components of the resource transfer card(s) 145, such as wireless communication by resource transfer card(s) 145.

The memory 186 stores information within the resource transfer card(s) 145. The memory 186 can be implemented as one or more of a computer-readable medium or media, a volatile memory unit or units, or a non-volatile memory unit or units, or as a portion of the integrated circuit containing the processor itself. The memory 186 may include, for example, flash memory and/or NVRAM memory. In some implementations, the memory 186 contains data of identifiers associated with the resource transfer card(s) such as a card number, expiration date, security code, name of the registrant, and so forth.

In some implementations, the user may use the resource transfer card(s) 145 to transmit and/or receive information or commands to and from the system 130 via the network 110. Any communication between the system 130 and the resource transfer card(s) 145 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the resource transfer card(s) 145 may provide the system 130 or endpoint device(s) 140 permissioned access to the protected resources of the resource transfer card(s) 145, which may include numbers associated with the resource transfer card(s) 145, customer information, etc.

The resource transfer card(s) 145 may communicate with the system 130 through communication interface 188, which may include digital signal processing circuitry where necessary. The communication interface 188 may provide for communications under various short-range communications such as using RFID, Bluetooth, Wi-Fi, or other such communications, as described herein.

In some implementations, the communication interface 188 may be a backscatter device, for example a backscatter device such as that which is described in U.S. Pat. No. 10,812,130. Backscatter devices harvest and utilize ambient signals (such as ambient Wi-Fi, short-range wireless data transfer protocol (e.g., Bluetooth), and/or other radio frequencies), toggle the impedance of the backscatter device, and/or eliminate higher order harmonic components of signals in order to communicate via a wireless Wi-Fi network without the need for a standalone power supply such as a battery or DC voltage. The backscatter device may include an antenna structured to backscatter a signal, a baseband circuitry to provide a frequency plan, a frequency synthesizer operatively coupled to the baseband circuitry, and/or a switch to control the backscatter device impedance. By implementing a backscatter device as the communication interface 188, the resource transfer card(s) 145 are able to connect to Wi-Fi networks of the IEEE 802.11 internet protocol.

Additionally, or alternatively, the communication interface 188 may be a tag such as an RFID or Near Field Communication (NFC) tag, wherein the tag is structured to be energized by a reader device of an endpoint device 140 through electromagnetic induction to transfer data. In such an implementation, the tag receives a request from the reader device, and returns a response to the reader device. Thereafter, the reader device communicates a corresponding IPv6 response package to another endpoint device 140 of the network (e.g., a node).

The resource transfer card(s) 145 may also contain an identity verification pad 182 operatively coupled to the processor 184, memory 186, and communication interface 188. The identity verification pad 182 may be a capacitive fingerprint reader structured to receive fingerprint image data, extract digital information and generate a current fingerprint template data (i.e., an authentication credential), and determine if the current fingerprint template data matches the enrollment fingerprint template data. Accordingly, the entity that issued the resource transfer card(s) 145 may confirm through the system 130 that the person utilizing the resource transfer card(s) 145 is the same as that which is permitted to do so. Alternatively, the authentication credential may be transmitted via the communication interface 188 to the entity for storage alongside metadata of the corresponding resource transfer, without any additional verification, determination, or other analysis.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a graphical representation of homomorphic ancillary document data encryption, data authentication, and data transfer, in accordance with an implementation of the disclosure. As shown in FIG. 2, the process may begin at block 202, where the system receives an interaction event from a terminal device of a merchant. The interaction event may be any data or signal that is generated by the terminal device as a result of a user initiating a resource transfer. For example, a user may be at a checkout counter at a merchant, and be prompted by the merchant (e.g., as a result of a merchant inputting a resource transfer amount or other details) to interact with the terminal device. The user may then provide an interaction such as an insert, swipe, or tap their resource transfer card on the terminal device. This insert, swipe, tap, or the like results in an interaction event that is sent to, and received by, the system. This interaction event may be accompanied by metadata indicating the type of resource transfer to occur, the resource transfer amount, date, time, network identifiers, hardware identifiers, or the like.

Indeed, the interaction event, as will be the basis for a particular type of resource transfer card discussed herein, may also include a signal containing a document data file data request, which may be a particular type of metadata or tag associated with certain resource transfers occurring at the terminal device. These resource transfers that will include a document data file data request may be predetermined by either the entity associated with the resource transfer card, the entity associated with the merchant, or both. For example, the entity associated with the merchant may predetermine that goods purchased at the merchant with particular UPC codes, such as adult beverages, require a copy of a drivers license to verify the date of birth of the purchaser. As such, the interaction event, if associated with one of these goods, may include a document data file data request. In another example, the entity associated with the resource transfer card may predetermine a resource transfer threshold (e.g., a certain amount of currency) above which a document data file data request is included with the interaction event.

Specific implementations of the resource transfer card described herein may fall into one of two categories: (i) a resource transfer card that includes a document data file (stored in the EMV chip or elsewhere) that is herein referred to as a "embedded document card" or "EDC", or (ii) a resource transfer card that does not include the document data file, herein referred to as a "traditional resource transfer card". Indeed, resource transfer cards of the first category may be useful in providing document data file to merchants, entities associated with the merchant, or the like, whereas resource transfer cards of the second category are unable to store or provide such data.

Thus, it shall be appreciated that the interaction event at the terminal device may be an interaction event that results from an interaction with an embedded document card (the first category), or an interaction event that results from an interaction with a traditional resource transfer card (the second category).

At block 204, the system may receive a first resource transfer card determination indicator upon a first condition where the resource transfer card is an embedded document card having at least one document data file stored thereon. Terminal devices are generally capable of determining characteristics or other features of resource transfer cards based on the contents or structure of the EMV chip that is presented to the terminal device. Accordingly, terminal devices may be outfitted with firmware or software, or be operatively coupled to network systems or middleware that renders the terminal device capable of discerning an embedded document card from a traditional resource transfer card.

For example, when the terminal device reads the contents of an EMV chip and determines that data of a particular format, name, or naming convention is present on the EMV chip, the terminal device may indicate to the system, via a first resource transfer card determination indicator, that the resource transfer card is an embedded document card. Therefore, it is deduced that the resource transfer card includes at least one document data file. The first resource transfer card determination indicator may be a predetermined signal or packets of data indicating as such.

As previously described, the at least one document data file may be a digital representations of a driver's license, birth certificate, identification card, insurance card, school identification card, digital photograph, or the like, in various formats for viewing, including, but not limited to, pdf, jpeg, tiff, png, or the like.

In some implementations, the system may receive a second resource transfer card determination indicator, upon a second condition where the resource transfer card comprises a traditional resource transfer card. In other words, if the terminal device does not indicate the presence of data of a particular format, name, or naming convention is present on the EMV chip, or in some implementations it positively receives the presence of data of a particular format, name, or naming convention indicating that the resource transfer card is a traditional resource transfer card, the second resource transfer card determination indicator is sent from the terminal device and received by the system. This second resource transfer card determination indicator may similarly be a predetermined signal or packets of data indicating as such.

Upon receiving the second resource transfer card determination indicator, the resource transfer is completed without retrieving any document data files from the resource transfer card, since the resource transfer card has been determined to either be unequipped with such document data files, or the resource transfer card is incapable of storing such document data files. Indeed, the resource transfer is completed without including the at least one document data file. If the at least one document data file is required by the merchant, the merchant may choose to receive the document (or document data file) using other means.

In doing so, the traditional methods of proceeding with the resource transfer are implemented. During a resource transfer, the cardholder presents their resource transfer card to the merchant, who initiates the resource transfer process through a terminal. The terminal communicates with the merchant's entity to relay resource transfer details. The merchant's entity forwards this information to the cardholder's entity via the network. The cardholder's entity verifies the resource transfer card details, checks available funds, and either approves or declines the resource transfer. This response is sent back through the network to the merchant's entity, who informs the merchant of the outcome. If approved, the merchant completes the resource transfer, and the cardholder's account is debited while the merchant's account is credited.

Nonetheless, assuming that the first resource transfer card determination indicator is received, thus indicating that the resource transfer card is an embedded document card, the process may continue at block 206, where the system receives a network check that includes a document data file trigger.

It shall be appreciated that through resource transfers, network check protocols may be routinely implemented to ensure that the network is secure, the terminal device is located in its expected location (either through geolocation, I.P. address verification, or the like), the network is able to transmit data effectively and efficiently, and so forth. However, in addition to all or some of the above actions of network check protocols, the presence of an embedded document card in the present system may also initiate the transmission of a document data file trigger from the terminal device to the system. The document data file trigger may be a packet or specific pattern of data that prompts subsequent actions, such as those actions that will be described in detail in the process steps below.

At block 208, the system may retrieve, from the resource transfer card, the at least one document data file. The at least one document data file may be retrieved by the terminal device and stored locally within a memory device, buffer, or the like within the terminal device.

In some implementations, as shown at block 210, the system may encrypt, at the terminal device, the at least one document data file using a homomorphic encryption protocol to generate at least one homomorphic encrypted document data file. The at least one document data file may be encrypted using a public key generated by a homomorphic encryption scheme. This may include using encryption protocols such as partially homomorphic encryption (PHE), which supports specific operations like addition or multiplication (e.g., RSA, ElGamal), somewhat homomorphic encryption (SHE), which supports limited operations before requiring decryption (e.g., Yao's Garbled Circuits), and fully homomorphic encryption (FHE), which supports arbitrary computations on ciphertexts (e.g., Gentry's scheme). In FHE, the encryption process involves algorithms that enable operations like addition and multiplication on encrypted data without revealing the plaintext. This may be achieved through schemes like lattice-based cryptography, which uses algebraic structures to maintain security and operational capabilities. Now having at least one homomorphic encrypted document data file, at block 212, the system may transmit, from the terminal device to a network associated with the merchant, the at least one homomorphic encrypted document data file.

In other implementations, the system may encrypt the at least one document data file at a processor of the system separate from the terminal device. In such scenarios, the at least one document data file on the resource transfer card may already be encrypted using an encryption scheme, not necessarily a homomorphic encryption scheme, and thus may be transmitted as at least one encrypted document data file to the entity system of the entity associated with the cardholder, whereafter the entity system decrypts the at least one document data file, prior to re-encrypting using a homomorphic encryption protocol. Thereafter, the entity system of the entity associated with the cardholder may then transmit the at least one homomorphic encrypted document data file to the entity system of the entity associated with the merchant.

Continuing at block 214, the system may receive, via an identity verification pad of the resource transfer card, a signal comprising an authentication credential associated with a cardholder of the resource transfer card. The identity verification pad, which may be a capacitive fingerprint reader, may capture fingerprint image data (i.e., fingerprint data) and may generate a current fingerprint template. The identity verification pad transmits the authentication credential to the system processor, memory, and communication interface for further processing and/or recording.

The communication interface 188 may facilitate the interaction between the resource transfer card and the system. This interface can operate using various short-range communication methods, including RFID, Bluetooth, and Wi-Fi. It may also incorporate a backscatter device, allowing the card to connect to Wi-Fi networks by utilizing ambient signals without a standalone power supply. Additionally, the interface may function as an RFID or NFC tag, energized by a reader device to transfer data. In either case, the authentication credential received from the identity verification pad is transmitted to the issuing entity, either for immediate confirmation or for storage alongside resource transfer metadata.

Next, at block 216, the system may record the authentication credential. The system may record the authentication credential for record-keeping purposes by storing the data in a secure database. For example, when the identity verification pad generates the current fingerprint template, this template, along with metadata about the resource transfer, may be transmitted via the communication interface to the system's processor. The processor may then store the authentication credential and resource transfer details in a designated memory location. This record-keeping allows for authentication attempts and resource transfers to be logged, and provide an audit trail that can be referenced for future verification.

In some implementations, the system may confirm the authenticity of the authentication credential by directly comparing the enrollment template with the newly captured fingerprint data. Upon receiving the current fingerprint template from the identity verification pad, the system's processor retrieves the stored enrollment template from its secure memory. It then performs a comparison using matching algorithms to determine if there is a match. If the current fingerprint template matches the enrollment template, the system authenticates the cardholder and allows the resource transfer to proceed. If there is no match, the system denies the resource transfer.

In some implementations, the system may receive, via an input to the terminal device of the merchant, a second signal comprising a second authentication credential associated with the cardholder of the resource transfer card, wherein the second authentication credential is a personal identification number. For example, in addition to a fingerprint-based authentication credential, the system may implement a secondary authentication mechanism using a Personal Identification Number ("PIN"). If the identity verification pad fails to authenticate the cardholder due to equipment malfunction, such as a faulty terminal device or identity verification pad, or due to a mismatch in the fingerprint data, the system may prompt the user to enter a PIN. This PIN can be input into a keypad or another user interface on the terminal device.

The processor and memory may handle the PIN entry process by initiating a prompt for the cardholder to input their PIN upon, for example, detecting a failure in the fingerprint authentication. Once the PIN is entered, the system may receive this second authentication credential through the terminal device communication interface. The system may then verify the PIN against the stored data associated with the cardholder. If the PIN matches the stored information, the system confirms the cardholder's identity and authorizes the resource transfer.

Additionally, the system may prompt for the second authentication credential (for example, a PIN) to enhance security, requiring it in addition to the first authentication credential (for example, a fingerprint authentication). Upon successful receipt or verification of the first authentication credential, the system may prompt the cardholder to provide the second authentication credential.

At block 218, the system may transmit, to the network associated with the merchant, a decryption key configured to decrypt the at least one homomorphic encrypted document data file. This process may implement secure communication protocols. For example, the cardholder's network may encrypt the decryption key using the merchant's public key. The encrypted key may then be embedded in a secure message formatted according to standards like ISO 8583, PCI DSS, or the like. The encrypted key may be transmitted through an encrypted channel, such as using Transport Layer Security (TLS), whereafter the merchant's network may receive the message, authenticate it to confirm its integrity and source, and then may use its private key to decrypt the decryption key.

The network associated with the merchant, now in possession of a decryption key to decrypt the at least one document data file, may either transmit the decryption key to an endpoint device of the merchant, the terminal device, or retain the decryption key elsewhere in the merchant network. In instances where the decryption key is transmitted to an endpoint device, terminal device, or the like, the encryption key may implement secure communication protocols such as those detailed above, including the encryption and transmission via ISO 8583, PCI DSS, or the like.

Thereafter the one or more document data files that have been retrieved, which have been encrypted via a homomorphic encryption protocol, may be decrypted using the decryption key. In doing so, the merchant via the merchant system may now have unfettered access to the one or more document data files to view, download, replicate, or the like in order to confirm the information thereon according to the merchant's needs for a particular resource transfer. For example, the merchant may view a drivers license or insurance card to ensure the cardholder meets certain requirements.

In some implementations, once the relevant information from the at least one document data file has been viewed, the system may re-encrypt the at least one document data file using an encryption key to encrypt to the homomorphic protocol. Additionally, or alternatively, the system may delete using scrubbing and/or overwriting of any memory device containing the at least one document data file to prevent any unauthorized access to the at least one document data file.

In some implementations, the process may continue by receiving, from the network associated with the merchant, an authorization request for the resource transfer and completing the resource transfer. Indeed, although the at least one document data file may now have been received by the merchant, or the network associated with the merchant, the actual transfer of resources via a resource transfer may be required. In some implementations, a prompt may be provided to the merchant or merchant network to receive an input as to whether the at least one document data file is satisfactory. Upon approval of such prompt, the system may begin the process of a resource transfer, in which the terminal communicates with the merchant's entity to relay resource transfer details. The merchant's entity may forward this information to the cardholder's entity via the network. The cardholder's entity verifies the resource transfer card details, checks available funds, and either approves or declines the resource transfer. This response is sent back through the network to the merchant's entity, who informs the merchant of the outcome. If approved, the merchant completes the resource transfer, and the cardholder's account is debited while the merchant's account is credited.

FIG. 3 illustrates a graphical architectural representation of homomorphic ancillary document data encryption, data authentication, and data transfer, in accordance with an implementation of the disclosure. The resource transfer card 300 containing at least one document data file 302 is presented to the card reader of a terminal device for a terminal device reading 302. The terminal device then determines if the resource transfer card is an embedded document card at block 306. If the terminal device reads the resource transfer card as being an embedded document card, the entity associated with the merchant at 308 sends a network security check at 310 which includes an indication that the resource transfer should include the at least one document data file. Thus, the request for the at least one document data file may be sent, in some implementations with the network security check, to the entity at 312. The entity then sends the details (e.g., decryption key) to the merchant, which allows the merchant having the at least one document data file at 316*a* to decrypt the files at 316*b* and collect a fingerprint for authentication at 316. Finally, the resource transfer is completed at 318. Alternatively, if the resource transfer card is not an embedded document card at 306, the process flow may be sent directly to completing the resource transfer at 318.

As will be appreciated by one of ordinary skill in the art, the present disclosure may be implemented as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for homomorphic ancillary document data encryption, data authentication, and data transfer, the system comprising:
   a processing device;
   a non-transitory storage device containing instructions when executed by the processing device, causes the processing device to perform the steps of:
   receiving an interaction event from a terminal device of a merchant, the terminal device generating the interaction event as a result of initiating a resource transfer comprising a document data file data request and receiving an interaction from a resource transfer card;
   receiving, upon a first condition where the resource transfer card comprises an embedded document card comprising at least one document data file, a first resource transfer card determination indicator;
   receiving a network check comprising a document data file trigger;
   retrieving, from the resource transfer card, the at least one document data file;
   encrypting, at the terminal device, the at least one document data file using a homomorphic encryption protocol to generate at least one homomorphic encrypted document data file;
   transmitting, from the terminal device to a network associated with the merchant, the at least one homomorphic encrypted document data file;
   receiving, via an identity verification pad of the resource transfer card, a signal comprising an authentication credential associated with a cardholder of the resource transfer card;
   recording the authentication credential; and
   transmitting, to the network associated with the merchant, a decryption key configured to decrypt the at least one homomorphic encrypted document data file.

2. The system of claim 1, wherein the instructions further cause the processing device to perform the steps of:
   receiving, from the network associated with the merchant, an authorization request for the resource transfer; and
   completing the resource transfer.

3. The system of claim 1, wherein the instructions further cause the processing device to perform the steps of:
   receiving, upon a second condition where the resource transfer card comprises a traditional resource transfer card, a second resource transfer card determination indicator.

4. The system of claim 3, wherein after receiving the second resource transfer card determination indicator, the resource transfer is completed without retrieving the at least one document data file.

5. The system of claim 1, wherein the at least one document data file is at least one selected from the group consisting of: driver's license, birth certificate, and identification card.

6. The system of claim 1, wherein the identity verification pad of the resource transfer card is a fingerprint reader, and wherein the authentication credential is fingerprint data.

7. The system of claim 6, wherein the instructions further cause the processing device to perform the steps of:
   receiving, via an input to the terminal device of the merchant, a second signal comprising a second authentication credential associated with the cardholder of the resource transfer card, wherein the second authentication credential is a personal identification number.

8. A computer program product for homomorphic ancillary document data encryption, data authentication, and data transfer, the computer program product comprising a non-transitory computer-readable medium comprising code causing an apparatus to:
   receive an interaction event from a terminal device of a merchant, the terminal device generating the interaction event as a result of initiating a resource transfer comprising a document data file data request and receiving an interaction from a resource transfer card;
   receive, upon a first condition where the resource transfer card comprises an embedded document card comprising at least one document data file, a first resource transfer card determination indicator;
   receive a network check comprising a document data file trigger;
   retrieve, from the resource transfer card, the at least one document data file;
   encrypt, at the terminal device, the at least one document data file using a homomorphic encryption protocol to generate at least one homomorphic encrypted document data file;
   transmit, from the terminal device to a network associated with the merchant, the at least one homomorphic encrypted document data file;

receive, via an identity verification pad of the resource transfer card, a signal comprising an authentication credential associated with a cardholder of the resource transfer card;

record the authentication credential; and transmit, to the network associated with the merchant, a decryption key configured to decrypt the at least one homomorphic encrypted document data file.

9. The computer program product of claim 8, wherein the code further causes the apparatus to:

receive, from the network associated with the merchant, an authorization request for the resource transfer; and complete the resource transfer.

10. The computer program product of claim 8, wherein the code further causes the apparatus to:

receive, upon a second condition where the resource transfer card comprises a traditional resource transfer card, a second resource transfer card determination indicator.

11. The computer program product of claim 10, wherein after receiving the second resource transfer card determination indicator, the resource transfer is completed without retrieving the at least one document data file.

12. The computer program product of claim 8, wherein the at least one document data file is at least one selected from the group consisting of: driver's license, birth certificate, and identification card.

13. The computer program product of claim 8, wherein the identity verification pad of the resource transfer card is a fingerprint reader, and wherein the authentication credential is fingerprint data.

14. The computer program product of claim 13, wherein the code further causes the apparatus to:

receive, via an input to the terminal device of the merchant, a second signal comprising a second authentication credential associated with the cardholder of the resource transfer card, wherein the second authentication credential is a personal identification number.

15. A method for homomorphic ancillary document data encryption, data authentication, and data transfer, the method comprising:

receiving an interaction event from a terminal device of a merchant, the terminal device generating the interaction event as a result of initiating a resource transfer comprising a document data file data request and receiving an interaction from a resource transfer card;

receiving, upon a first condition where the resource transfer card comprises an embedded document card comprising at least one document data file, a first resource transfer card determination indicator;

receiving a network check comprising a document data file trigger;

retrieving, from the resource transfer card, the at least one document data file;

encrypting, at the terminal device, the at least one document data file using a homomorphic encryption protocol to generate at least one homomorphic encrypted document data file;

transmitting, from the terminal device to a network associated with the merchant, the at least one homomorphic encrypted document data file;

receiving, via an identity verification pad of the resource transfer card, a signal comprising an authentication credential associated with a cardholder of the resource transfer card;

recording the authentication credential; and transmitting, to the network associated with the merchant, a decryption key configured to decrypt the at least one homomorphic encrypted document data file.

16. The method of claim 15 further comprising:

receiving, from the network associated with the merchant, an authorization request for the resource transfer; and completing the resource transfer.

17. The method of claim 15, further comprising:

receiving, upon a second condition where the resource transfer card comprises a traditional resource transfer card, a second resource transfer card determination indicator.

18. The method of claim 15, wherein the at least one document data file is at least one selected from the group consisting of: driver's license, birth certificate, and identification card.

19. The method of claim 15, wherein the identity verification pad of the resource transfer card is a fingerprint reader, and wherein the authentication credential is fingerprint data.

20. The method of claim 19, further comprising:

receiving, via an input to the terminal device of the merchant, a second signal comprising a second authentication credential associated with the cardholder of the resource transfer card, wherein the second authentication credential is a personal identification number.

\* \* \* \* \*